US012433947B2

(12) United States Patent
Jayaraman et al.

(10) Patent No.: US 12,433,947 B2
(45) Date of Patent: Oct. 7, 2025

(54) STABLE FORMULATIONS OF THERAPEUTIC ANTIBODY

(71) Applicant: DR. REDDY'S LABORATORIES LIMITED, Hyderabad (IN)

(72) Inventors: Murali Jayaraman, Kancheepuram (IN); Anuja Chandrasekar, Chennai (IN)

(73) Assignee: DR. REDDY'S LABORATORIES LIMITED, Hyderabad (IN)

(*) Notice: Subject to any disclaimer, the term of this patent is extended or adjusted under 35 U.S.C. 154(b) by 451 days.

(21) Appl. No.: 17/045,406

(22) PCT Filed: Apr. 10, 2019

(86) PCT No.: PCT/IN2019/050293
§ 371 (c)(1),
(2) Date: Oct. 5, 2020

(87) PCT Pub. No.: WO2019/198101
PCT Pub. Date: Oct. 17, 2019

(65) Prior Publication Data
US 2021/0401982 A1 Dec. 30, 2021

(30) Foreign Application Priority Data
Apr. 10, 2018 (IN) .............................. 201841013647

(51) Int. Cl.
*A61K 9/19* (2006.01)
*A61K 39/395* (2006.01)
(Continued)

(52) U.S. Cl.
CPC .......... *A61K 39/39591* (2013.01); *A61K 9/19* (2013.01); *A61K 47/22* (2013.01);
(Continued)

(58) Field of Classification Search
CPC .... A61K 39/39591; A61K 9/19; A61K 47/22; A61K 47/26; A61K 9/0019; C07K 16/2839; C07K 2317/24
See application file for complete search history.

(56) References Cited

U.S. PATENT DOCUMENTS 9,764,033 B2 9/2017 Diluzio et al.
2009/0162352 A1 6/2009 Adler et al.
(Continued)

FOREIGN PATENT DOCUMENTS

KR 101884406 B1 8/2018
WO 2004/071439 A2 8/2004
(Continued)

OTHER PUBLICATIONS

Wei Wang. Instability, stabilization, and formulation of liquid protein pharmaceuticals. International Journal of Pharmaceutics, vol. 185, Issue 2. (Year: 1999).*
Wang, W., et al (2007) Antibody structure, instability, and formulation Journal of Pharmaceutical Sciences 96(1); 1-26 (Year: 2007).*
Le Basle, Y., et al (2020) Physicochemical stability of monoclonal antibodies: A review Journal of Pharmaceutical Sciences 109; 169-190 (Year: 2020).*
(Continued)

*Primary Examiner* — Scarlett Y Goon
*Assistant Examiner* — Audrey L Buttice
(74) *Attorney, Agent, or Firm* — PERGAMENT & CEPEDA LLP

(57) ABSTRACT

The present invention discloses a stable pharmaceutical formulation of an antibody, wherein the formulation contains buffer, surfactant and sugar, and wherein the formulation is devoid of free amino acids and salts.

4 Claims, 5 Drawing Sheets

(51) Int. Cl.
*A61K 47/22* (2006.01)
*A61K 47/26* (2006.01)
*C07K 16/28* (2006.01)

(52) U.S. Cl.
CPC .......... *A61K 47/26* (2013.01); *C07K 16/2839* (2013.01); *C07K 2317/24* (2013.01)

(56) References Cited

U.S. PATENT DOCUMENTS

| | | |
|---|---|---|
| 2009/0208492 A1 | 8/2009 | O'Connor et al. |
| 2012/0282249 A1 | 11/2012 | Fox et al. |
| 2014/0341885 A1 | 11/2014 | Diluzio et al. |
| 2014/0377251 A1 | 12/2014 | Diluzio et al. |

FOREIGN PATENT DOCUMENTS

| | | | | |
|---|---|---|---|---|
| WO | WO 2008/157356 A2 | * | 12/2008 | ............ C07K 16/00 |
| WO | WO-2012151248 A2 | * | 11/2012 | ........... A61K 39/395 |
| WO | 2017/015198 A1 | | 1/2017 | |
| WO | 2020/252069 A1 | | 12/2020 | |

OTHER PUBLICATIONS

Harris, R.J., et al (2004) Commercial manufacturing scale formulation and analytical characterization of therapeutic recombinant antibodies Drug development research 61; 131-154 (Year: 2004).*
International Search Report dated Jul. 19, 2019, for corresponding International Patent Application No. PCT/IN2019/050293.
Written Opinion dated Jul. 19, 2019, for corresponding International Patent Application No. PCT/IN2019/050293.

* cited by examiner

STABLE FORMULATIONS OF THERAPEUTIC ANTIBODY

This application is a National Stage Application under 35 U.S.C. § 371 of PCT International Application No. PCT/IN2019/050293, filed Apr. 10, 2019, which claims the benefit of Indian provisional patent application No. 20/184, 1013647 filed on Apr. 10, 2018, all of which are herein incorporated by reference in their entireties.

FIELD OF INVENTION

The present invention is related to stable formulations of an antibody molecule, wherein the antibody is stabilized with minimal excipients. The disclosed formulations are compatible with lyophilized as well as liquid form and also suitable for intravenous and/or subcutaneous route of administration.

BACKGROUND

Over the past two decades, recombinant DNA technology has led to the commercialization of many proteins, particularly antibody therapeutics. The effectiveness of these therapeutic antibodies is majorly dependent on the stability, route of administration and their dosage forms and concentrations. This in turn, necessitates therapeutic antibodies to be formulated appropriately to retain the stability and activity of a therapeutic antibody.

Formulations for each route of administration and dosage forms may be unique and, therefore, have specific requirements. Solid dosage forms, such as lyophilized powders, are generally more stable than liquid (aqueous) formulations. However, reconstitution of the lyophilized formulation requires a significant vial overfill, care in handling and involves high production cost relative to a liquid formulation. While liquid formulations are advantageous in these and are usually preferred for injectable protein therapeutics (in terms of convenience for the end user and ease of preparation for the manufacturer), this form may not always be feasible given the susceptibility of proteins to denaturation, aggregation and oxidation under stresses such as temperature, pH changes, agitation etc. All of these stress factors could result in the loss of biological activity of a therapeutic protein/antibody. In particular, high concentration liquid formulations are susceptible to degradation and/or aggregation. Nevertheless, high concentration formulations may be desirable for subcutaneous or intravenous route of administration, as the frequency of administration and injection volume is reduced. On the other hand, specific treatment schedule and dosing might require a low concentration formulation and prefer intravenous route of administration for more predictable delivery and complete bioavailability of the therapeutic drug.

Hence, designing a formulation that is stable at high or low concentrations of the therapeutic protein/antibody, aiding in different route of administration (intravenous or subcutaneous) and which is suitable in lyophilized or liquid form, pose a significant developmental challenge. Further, every protein or antibody with its unique characteristics and properties of degradation, adds to the complexity in the development of a stable formulation and may demand a specific formulation.

A stable formulation of a therapeutic protein or antibody involves addition of a wide variety of stabilizers/excipients including amino acids, sugars, polyols, surfactants, salts, polymers, amines, anti-oxidants, chelators etc. Many of the FDA approved therapeutic proteins/antibodies contain more than one category of stabilizers.

A formulation combination with increased concentration of protein and/or stabilizers may increase the viscosity of the formulation, in turn increasing the injection time and pain at the site of injection and also pose difficulties during processing of the drug substance. Hence, it is necessary to develop an improved formulation, in lyophilized as well as liquid form which contains minimal number or concentration of excipients, yet stabilizing the drug at a wide range of its concentration.

SUMMARY

The present invention discloses a stable pharmaceutical formulation of an antibody comprising buffer, sugar and surfactant, wherein the formulation is devoid of free amino acid and salt. The antibody according to the invention binds to α4β7.

In particular, the invention discloses a method of reducing/preventing formation of aggregates and fragments in α4β7 antibody containing formulation, during storage, by addition of optimal concentration of sugar, wherein the formulation does not contain free amino acid and salt.

The optimum concentration of sugar present in the disclosed α4β7 antibody formulation is at least about 60 mg/ml.

BRIEF DESCRIPTION OF DRAWINGS

FIG. 1 (a) represents LMW content, at '0' time point LMW content is zero, FIG. 1 (b) represents aggregate content and FIG. 1 (c) represents monomer content during storage conditions at 50° C. for two weeks.

FIG. 2 (a) represents LMW content, at '0' time point LMW content is zero, FIG. 2 (b) represents aggregate content and FIG. 2 (c) represents monomer content during storage conditions at 50° C. for two weeks.

FIG. 3 (a) represents LMW content, at '0' time point LMW content is zero, FIG. 3 (b) represents aggregate content and FIG. 3 (c) represents monomer content during storage conditions at 50° C. for two weeks.

DETAILED DESCRIPTION OF THE INVENTION

Definitions

Figure 1:
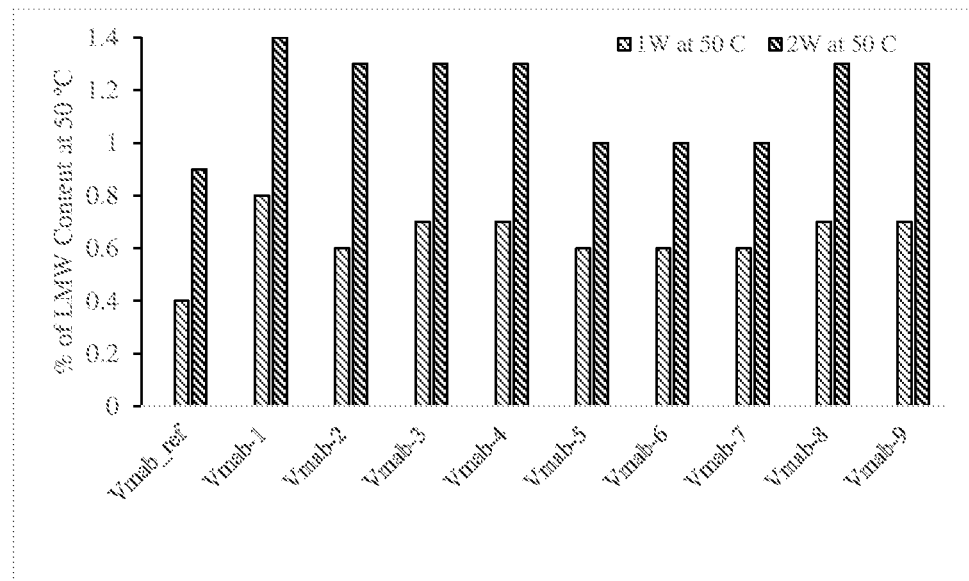
FIG. 1 illustrates the effect of various sugars on the LMW, HMW and monomer content of vedolizumab (60 mg/ml) formulations prepared as per example 1 and analyzed using SEC chromatography.
Figure 1:
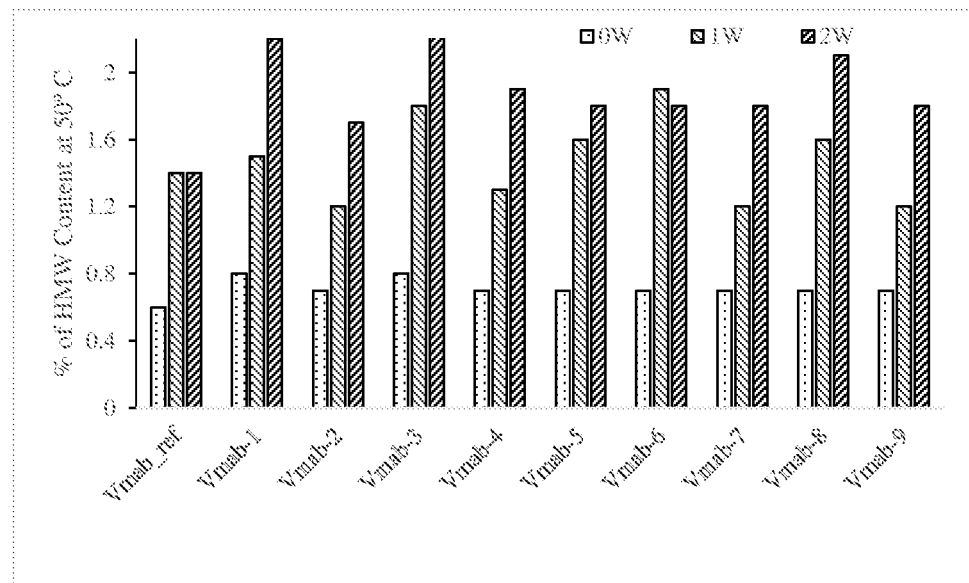
Figure 1:
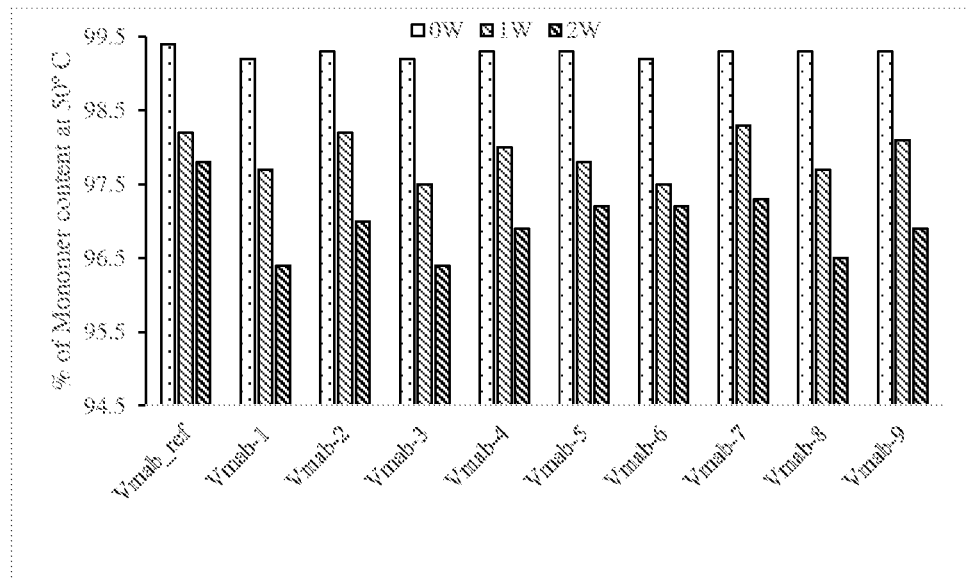

The term "antibody" refers to a glycoprotein comprising at least two heavy (H) chains and two light (L) chains inter-connected by disulfide bonds, or an antigen-binding portion thereof. The "antibody" as used herein encompasses whole antibodies or any antigen binding fragment (i.e., "antigen-binding portion") or fusion protein thereof.

The term "stable" formulation refers to the formulation wherein the antibody therein retains its physical stability and/or chemical stability and/or biological activity upon storage.

Stability studies provides evidence of the quality of an antibody under the influence of various environmental factors during the course of time. ICH's "Q1A: Stability Testing of New Drug Substances and Products," states that data from accelerated stability studies can be used to evaluate the effect of short-term excursions higher or lower than label storage conditions that may occur during the shipping of the antibodies.

Various analytical methods are available for measuring the physical and chemical degradation of the antibody in the pharmaceutical formulations. An antibody "retains its physical stability" in a pharmaceutical formulation if it shows substantially no signs of aggregation, precipitation and/or denaturation upon visual examination of color and/or clarity, or as measured by UV light scattering or by size exclusion chromatography. An antibody is said to "retain its chemical stability" in a pharmaceutical formulation when its shows no or minimal formation of product variants which may include variants as a result of chemical modification of antibody of interest such as deamination, oxidation etc. Analytical methods such as ion exchange chromatography and hydrophobic ion chromatography may be used to investigate the chemical product variants.

The term 'monomer' as used herein describes antibodies consisting of two light chains and two heavy chains. The monomer content of an antibody composition is typically analyzed by size exclusion chromatography (SEC). As per the separation principle of SEC the large molecules or molecules with high molecular weight (HMW) elute first followed by smaller or lower weight molecules. In a typical SEC profile for an antibody composition, aggregates that may include dimers, multimers, etc., elute first, followed by monomer, and the clipped antibody variants or degradants may be eluted last. In some circumstances the aggregate peak or the degradant peaks may not elute as a baseline separated peaks but instead as a shoulder or abnormal broad peaks. In order to maintain the appropriate activity of an antibody, in particular of a therapeutic antibody, it is desirable to reduce the formation of aggregate or fragmentation of products and hence control the monomer content to a target value. Ability to inhibit the formation of aggregate and degradant content as measured at various time points during stability studies may indicate the suitability of the candidate formulation for antibody of interest. TSK-GEL G3000SWXL (7.8 mm×30 cm) column from TOSCH can be used on water HPLC to perform SEC.

Pharmaceutically acceptable excipients refer to the additives or carriers, which may contribute to stability of the antibody in formulation. The excipients may encompass stabilizers and tonicity modifiers. Examples of stabilizers and tonicity modifiers include, but not limited to, sugars, polyols, salts, surfactants, and derivatives and combination thereof.

Sugar/s herein includes sugars and sugar alcohols such as polyols. Sugars can be referred to monosaccharides, disaccharides, and polysaccharides. Examples of sugars include, but are not limited to, sucrose, trehalose, glucose, dextrose, raffinose and others. Examples of polyols include, but are not limited to, mannitol, sorbitol, and others.

Surfactant refers to pharmaceutically acceptable excipients used to protect the protein formulations against various stress conditions, like agitation, shearing, exposure to high temperature etc. The suitable surfactants include but are not limited to polyoxyethylensorbitan fatty acid esters such as Tween 20™ or Tween 80™, polyoxyethylene-polyoxypropylene copolymer (e.g. Poloxamer, Pluronic), sodium dodecyl sulphate (SDS) and the like or combination thereof.

The term "free amino acid" as used herein refers to amino acid that is included in the formulation and is not a part of the buffer component. An amino acid may be present in its D- and/or L-form. The amino acid may be present as any suitable salt e.g. a hydrochloride salt, such as Arginine-HCl.

Examples of salts include, but not limited to, sodium chloride, potassium chloride, magnesium chloride, sodium thiocyanate, ammonium thiocyanate, ammonium sulfate, ammonium chloride, calcium chloride, zinc chloride and/or sodium acetate.

Certain specific aspects and embodiments of the invention are more fully described by reference to the following examples. However, these examples should not be construed as limiting the scope of the invention in any manner.

DETAILED DESCRIPTION OF THE EMBODIMENTS

The present invention discloses a stable pharmaceutical formulation of an antibody comprising buffer, sugar and surfactant, wherein the formulation is devoid of free amino acid and salt.

In the above embodiment, the antibody is a therapeutic monoclonal antibody.

In the above mentioned embodiment, the therapeutic antibody binds to α4β7.

In one embodiment, the invention discloses a stable pharmaceutical formulation of α4β7 antibody comprising buffer, sugar and surfactant, wherein the formulation is devoid of free amino acid and salts.

In the above said embodiment, the concentration of sugar which stabilizes α4β7 antibody formulation is at least about 60 mg/ml.

In an embodiment, the invention discloses a stable pharmaceutical formulation of α4β7 antibody comprising buffer, about 60 mg/ml of sugar, surfactant and, wherein the formulation is devoid of free amino acid and salts.

In any of the above mentioned embodiments, the sugar is sucrose, trehalose or sorbitol.

In any of the above mentioned embodiments, the said buffer includes organic buffer, inorganic buffer and/or combinations thereof.

In the above mentioned embodiment, organic buffer include histidine, succinate or acetate buffer and their salts thereof and inorganic buffer includes include phosphate buffer.

In another embodiment, the invention discloses a method of reducing formation of aggregate content and/or fragmentation of α4β7 antibody, during storage, in a formulation, by addition of at least 60 mg/ml of sugar, wherein the said formulation is devoid of free amino acid and salt.

In the above said embodiment, the amount of aggregate and fragment content in α4β7 antibody formulation is less than about 1.5% and less than about 2% respectively in the formulation, when stored at 50° C. for two weeks.

In an embodiment, the invention discloses a stable pharmaceutical formulation comprising, an α4β7 antibody, phosphate buffer, at least 60 mg/ml of sucrose, surfactant and, wherein the formulation is devoid of free amino acid and salt.

In all of the above embodiments of the invention, the concentration of the antibody in α4β7 formulation is about 50 mg/ml to about 200 mg/ml.

In any of the said embodiments of the invention, the pH of α4β7 antibody formulation is from 6.0-7.0.

In another embodiment, the present invention provides a liquid formulation which can be used for parenteral administration. Parenteral administration includes intravenous, subcutaneous, intra peritoneal, intramuscular, administration or any other route of delivery generally considered to be falling under the scope of parenteral administration and as is well known to a skilled person.

In any of the above said embodiments of the invention, the stable pharmaceutical formulation of α4β7 antibody is in liquid/aqueous form that is suitable for lyophilization. Further, the lyophilized formulation of α4β7 antibody is reconstituted with appropriate diluent to achieve the liquid formulation suitable for administration.

EXAMPLES

An α4β7 antibody, vedolizumab suitable for storage in the present pharmaceutical composition, is produced by standard methods known in the art. For example, vedolizumab is prepared by recombinant expression of immunoglobulin light and heavy chain genes in a mammalian host cell such as Chinese Hamster Ovary cells. Further, the expressed vedolizumab is harvested and the crude harvest is subjected to standard downstream process steps that include purification, filtration and optionally dilution or concentration steps. For example, the crude harvest of vedolizumab may be purified using standard chromatography techniques such as affinity chromatography, ion-exchange chromatography and combinations thereof. The purified vedolizumab solution can additionally be subjected to one or more filtration steps, and the solution obtained is subjected to further formulation studies. Vedolizumab (at a concentration of 8 mg/ml) in Tris acetate buffer obtained from downstream chromatographic process was buffer exchanged and concentrated in histidine buffer up to 70 mg/ml. The concentrated vedolizumab was used in subsequent experiments.

Example 1: Effect of Amino Acid on Stability of Vedolizumab Formulations Containing Various Sugars To understand the effect of concentration of various sugars with and without amino acids on stability of vedolizumab, formulations with different sugars such as sucrose, trehalose and sorbitol were prepared. A portion of the concentrated vedolizumab in histidine buffer back ground was buffer exchanged into 20 mM phosphate buffer. Post which, sugar and polysorbate, were added to vedolizumab formulations present in histidine buffer back ground as well as phosphate buffer background. Arginine was selected as free-amino acid and added to a few of sugar containing vedolizumab formulations to understand the effect of free amino acid in stabilizing vedolizumab.

FDA approved vedolizumab formulation contains arginine, histidine buffer and surfactant. Hence, the same excipients were added to vedolizumab in histidine buffer background and this has been used as reference standard in subsequent experiments.

Details of the formulations used in this experiment is given in Table 1. All the samples were subjected for stability studies at 50° C. for two weeks. Post which, the samples were analyzed for low molecular weight (LMW) species or fragments, high molecular weight (HMW) species or aggregates) and monomer content [results are shown in FIG. 1(a)-(c)] using size exclusion chromatography (SEC). Visual inspection data of the vedolizumab samples are given in Table 2.

TABLE 1

Compositions of vedolizumab formulations containing sugars, with and without amino acids

| Sample Name | Composition |
|---|---|
| Vmab_ref | Vedolizumab 60 mg/ml, 50 mM histidine monohydrochloride, 27.4 mg/mL L-arginine hydrochloride, 104.17 mg/mL sucrose, 0.6 mg/mL polysorbate 80 |
| Vmab-1 | Vedolizumab 60 mg/ml, 20 mM phosphate buffer, sucrose 30 mg/ml and 0.6 mg/mL polysorbate 80 |
| Vmab-2 | Vedolizumab 60 mg/ml, 20 mM phosphate buffer, sucrose 30 mg/ml, 25 mM arginine and 0.6 mg/mL polysorbate 80 |
| Vmab-3 | Vedolizumab 60 mg/ml, 20 mM phosphate buffer, sorbitol 30 mg/ml and 0.6 mg/mL polysorbate 80 |
| Vmab-4 | Vedolizumab 60 mg/ml, 20 mM phosphate buffer, sorbitol 30 mg/ml, 25 mM arginine and 0.6 mg/mL polysorbate 80 |
| Vmab-5 | Vedolizumab 60 mg/ml, 20 mM phosphate buffer, sucrose 60 mg/ml and 0.6 mg/mL polysorbate 80 |
| Vmab-6 | Vedolizumab 60 mg/ml, 20 mM phosphate buffer, sucrose 60 mg/ml, 25 mM arginine and 0.6 mg/mL polysorbate 80 |
| Vmab-7 | Vedolizumab 60 mg/ml, 20 mM phosphate buffer, sucrose 60 mg/ml, 50 mM arginine and 0.6 mg/mL polysorbate 80 |
| Vmab-8 | Vedolizumab 60 mg/ml, 20 mM phosphate buffer, Trehalose 60 mg/ml and 0.6 mg/mL polysorbate 80 |
| Vmab-9 | Vedolizumab 60 mg/ml, 20 mM phosphate buffer, Trehalose 60 mg/ml, 25 mM arginine and 0.6 mg/mL polysorbate 80 |

TABLE 2

Visual inspection data of vedolizumab (60 mg/ml) formulations prepared as per example 1

| | Visual Inspection at 50° C. | | |
|---|---|---|---|
| Sample Name | 0 W | 1 W | 2 W |
| Vmab_ref | Clear | Slightly Opalescent | Slightly Opalescent |
| Vmab-1 | Clear with few particles | Slightly Opalescent | Slightly Opalescent |
| Vmab-2 | Clear with few particles | Slightly Opalescent | Slightly Opalescent |
| Vmab-3 | Clear with few particles | Slightly Opalescent | Slightly Opalescent |
| Vmab-4 | Clear with few particles | Slightly Opalescent | Slightly Opalescent |
| Vmab-5 | Slightly Opalescent | Slightly Opalescent | Slightly Opalescent |
| Vmab-6 | Slightly Opalescent | Opalescent | Opalescent |
| Vmab-7 | Slightly Opalescent | Slightly Opalescent | Slightly Opalescent |
| Vmab-8 | Clear with few particles | Slightly Opalescent | Slightly Opalescent |
| Vmab-9 | Clear with few particles | Slightly Opalescent | Slightly Opalescent |

W—indicates weeks

Example 2: Formulations of Vedolizumab, with and without Salt

Figure 2:
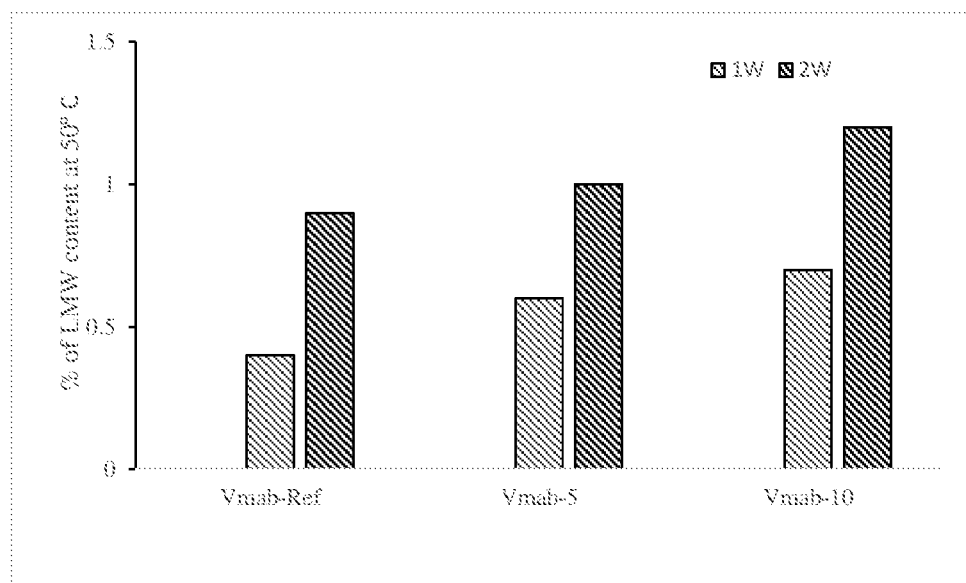
FIG. 2 illustrates the effect of salt on the LMW, HMW and monomer content of vedolizumab (60 mg/ml) formulations prepared as per example 2 and analyzed using SEC chromatography.
Figure 2:
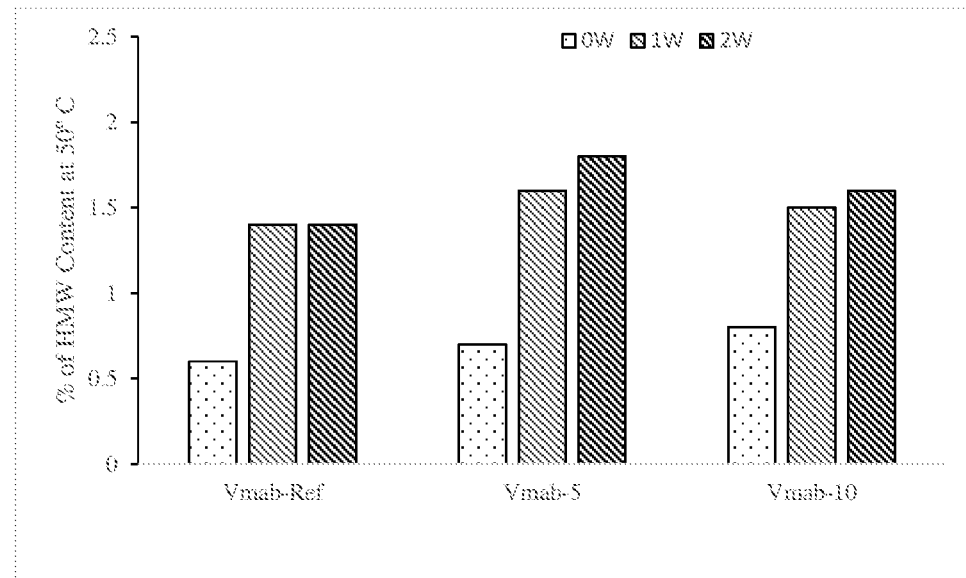
Figure 2:
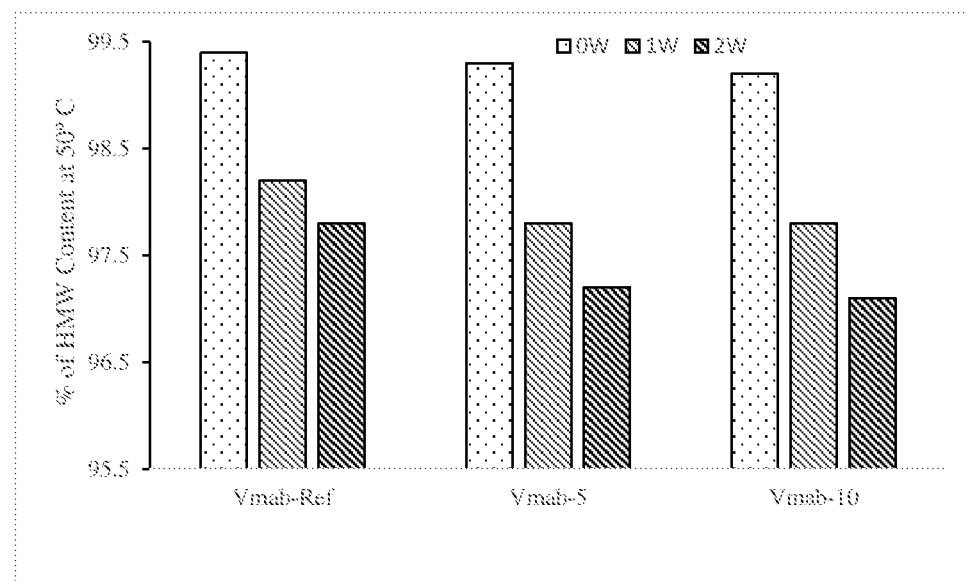

To understand the effect of salt on stability vedolizumab formulations containing sucrose 60 mg/ml and surfactant, 50 mM sodium chloride was added to one of the vedolizumab formulation. Details of the formulations are given in Table 3. All the samples were subjected for accelerated stability studies at 50° C. for 2 weeks. Post which, the samples were analyzed for low molecular weight (LMW) species or fragments, high molecular weight (HMW) species or aggregates) and monomer content [results are shown in FIG. 2 (a)-(c)] using size exclusion chromatography (SEC). Visual inspection data of the vedolizumab samples are given in Table 4.

TABLE 3

Compositions of vedolizumab formulations prepared as per example 2

| Sample Name | Composition |
|---|---|
| Vmab_ref | Vedolizumab 60 mg/ml, 50 mM histidine buffer, monohydrochloride, 27.4 mg/mL L-arginine hydrochloride, 104.17 mg/mL sucrose, 0.6 mg/mL polysorbate 80 |
| Vmab-5 | Vedolizumab 60 mg/ml, 20 mM phosphate buffer, sucrose 60 mg/ml, and 0.6 mg/mL polysorbate 80 |
| Vmab-10 | Vedolizumab 60 mg/ml, 20 mM phosphate buffer, sucrose 60 mg/ml, 50 mM NaCl and 0.6 mg/mL polysorbate 80 |

TABLE 4

Visual inspection data of vedolizumab (60 mg/ml) formulations prepared as per example 2

| | Visual Inspection at 50° C. | | |
|---|---|---|---|
| Sample Name | 0 W | 1 W | 2 W |
| Vmab_ref | Clear | Slightly Opalescent | Slightly Opalescent |
| Vmab-5 | Slightly Opalescent | Slightly Opalescent | Slightly Opalescent |
| Vmab-10 | Slightly Opalescent | Slightly Opalescent | Opalescent |

W—indicates weeks

Example 3: Formulations of Vedolizumab in Various Buffer Back Grounds

Figure 3:
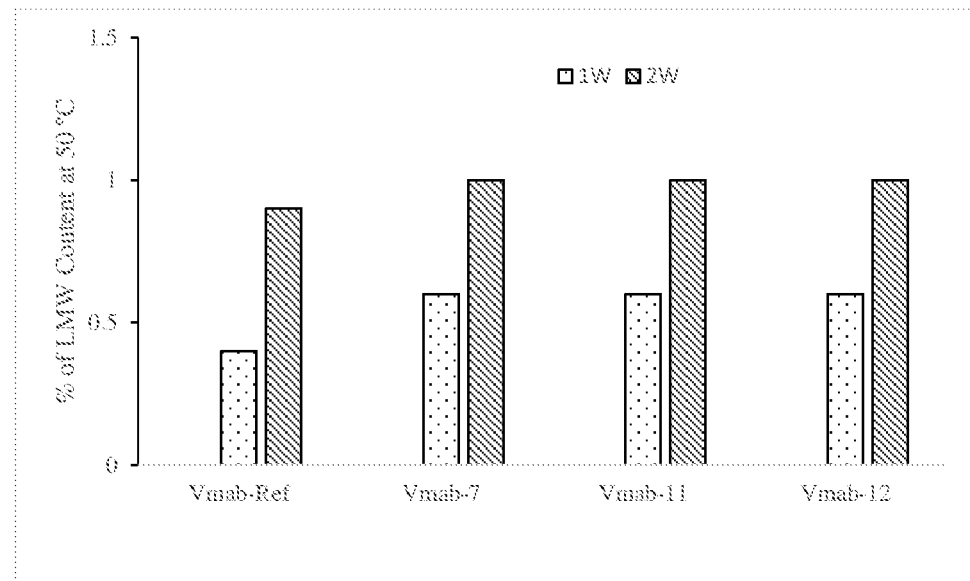
FIG. 3 illustrates the effect of salt on the LMW, HMW and monomer content of vedolizumab (60 mg/ml) formulations prepared as per example and analyzed using SEC chromatography.
Figure 3:
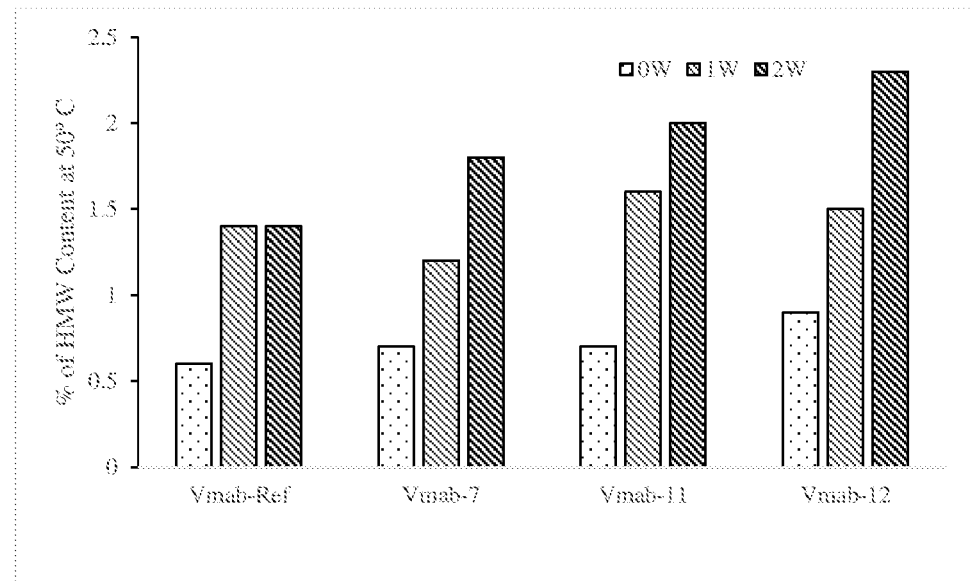
Figure 3:
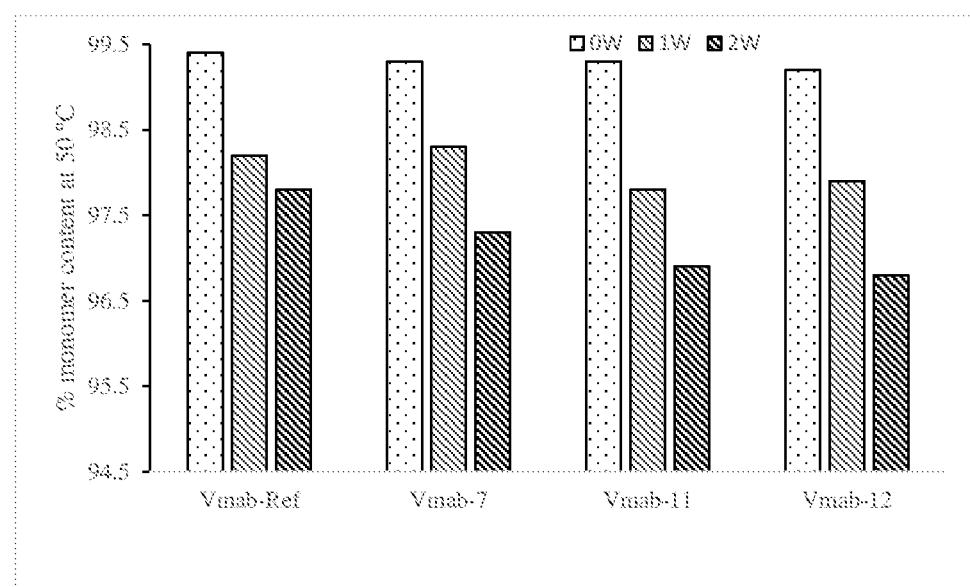

To understand the effect of different buffer back ground on vedolizumab formulations containing sucrose 60 mg/ml, 50 mM arginine and surfactant, various buffers were prepared and same composition of vedolizumab was formulated in different buffer back ground. Details of the formulations are given in Table 5. All the samples were subjected for accelerated stability studies at 50° C. for 2 weeks. Post which, the samples were analyzed for low molecular weight (LMW/fragments) species, high molecular weight species (HMW/aggregates) and monomer content [results are shown in FIG. 3 (a)-(c)] using size exclusion chromatography (SEC). Visual inspection data of the vedolizumab samples are given in Table 6.

TABLE 5

Compositions of vedolizumab formulations in different buffer background.

| Sample Name | Composition |
|---|---|
| Vmab_ref | Vedolizumab 60 mg/ml, 50 mM histidine monohydrochloride, 27.4 mg/mL L-arginine hydrochloride, 104.17 mg/mL sucrose, 0.6 mg/mL polysorbate 80 |
| Vmab-7 | Vedolizumab 60 mg/ml, 20 mM phosphate buffer, sucrose 60 mg/ml, 50 mM arginine and 0.6 mg/mL polysorbate 80 |
| Vmab-11 | Vedolizumab 60 mg/ml, 20 mM acetate buffer, sucrose 60 mg/ml, 50 mM arginine and 0.6 mg/mL polysorbate 80 |
| Vmab-12 | Vedolizumab 60 mg/ml, 20 mM succinate buffer, sucrose 60 mg/ml, 50 mM arginine and 0.6 mg/mL polysorbate 80 |

TABLE 6

Visual inspection data of vedolizumab (60 mg/ml) formulations prepared as per example 3

| | Visual Inspection at 50° C. | | |
|---|---|---|---|
| Sample Name | 0 W | 1 W | 2 W |
| Vmab_ref | Clear | Slightly Opalescent | Slightly Opalescent |
| Vmab-7 | Slightly Opalescent | Slightly Opalescent | Slightly Opalescent |
| Vmab-11 | Clear | Clear | Clear |
| Vmab-12 | Clear | Clear | Clear |

W—indicates weeks

Liquid formulations of vedolizumab samples prepared as per example 1, 2 and 3 were subjected for lyophilization technique known in the art and checked for stability.

The invention claimed is:

1. A stable pharmaceutical formulation of vedolizumab comprising 60 mg/ml of vedolizumab, phosphate buffer at a concentration of 20 mM, 60 mg/ml sugar selected from sucrose or trehalose, and surfactant, wherein the formulation is devoid of free amino acid and is devoid of salt of amino acid, and wherein the amount of aggregate and fragment content is less than about 2% and less than about 1.5% respectively, when stored at 50° C. for two weeks.

2. The stable pharmaceutical formulation of vedolizumab according to claim 1, which formulation has a pH of 6.0 to 7.0.

3. A method of making a stable pharmaceutical formulation of vedolizumab of claim 1, wherein the method comprises: buffer-exchanging the vedolizumab antibody in histidine buffer to phosphate buffer.

4. The method of claim 3, further comprising: after buffer-exchanging into the phosphate buffer, adding the sugar.

* * * * *